(12) United States Patent
Moon et al.

(10) Patent No.: US 9,641,924 B2
(45) Date of Patent: May 2, 2017

(54) ELECTRONIC DEVICE INCLUDING SOUND OUTPUT MODULE AND HOUSING FOR THE ELECTRONIC DEVICE

(71) Applicant: Samsung Electronics Co., Ltd., Suwon-si, Gyeonggi-do (KR)

(72) Inventors: Heecheul Moon, Seongnam-si (KR); Jongchul Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 198 days.

(21) Appl. No.: 14/197,838

(22) Filed: Mar. 5, 2014

(65) Prior Publication Data

US 2014/0270301 A1    Sep. 18, 2014

(30) Foreign Application Priority Data

Mar. 13, 2013  (KR) .................. 10-2013-0026498

(51) Int. Cl.
*H04R 1/02*  (2006.01)
*H01M 2/10*  (2006.01)

(52) U.S. Cl.
CPC .......... *H04R 1/028* (2013.01); *H01M 2/1066* (2013.01); *H04R 2499/11* (2013.01)

(58) Field of Classification Search
CPC . H04R 1/00; H04R 1/02; H04R 1/026; H04R 1/028; H04R 1/28; H04R 2499/11; H04R 2499/15; H05K 5/00; H05K 5/0217; H01M 10/623; H01M 2/1016; H01M 2/1022; H01M 2/00; H01M 2/02; H01M 2/0202; H01M 2/026; H01M 2/10; H01M 2220/30; H04M 1/026; H04M 1/0262; H04M 1/04

USPC ....... 381/87, 333–334; 361/600, 679.01, 752

See application file for complete search history.

(56) References Cited

U.S. PATENT DOCUMENTS

| 8,503,970 | B1* | 8/2013 | Uyehara | H04M 1/0262 |
| | | | | 379/428.01 |
| 2009/0247237 | A1* | 10/2009 | Mittleman | H04M 1/026 |
| | | | | 455/567 |
| 2010/0304796 | A1* | 12/2010 | Stohr | H05K 9/0075 |
| | | | | 455/575.1 |
| 2010/0322456 | A1 | 12/2010 | Park et al. | |
| 2012/0201414 | A1* | 8/2012 | Moon | G06F 1/1616 |
| | | | | 381/387 |
| 2013/0033401 | A1* | 2/2013 | Kim | H04M 1/035 |
| | | | | 343/702 |

FOREIGN PATENT DOCUMENTS

KR    10-2004-0063071 A    7/2004
KR    10-2010-0135356 A    12/2010

* cited by examiner

*Primary Examiner* — MD S Elahee
*Assistant Examiner* — Sabrina Diaz
(74) *Attorney, Agent, or Firm* — Jefferson IP Law, LLP

(57) ABSTRACT

An electronic device including a sound output module and a housing for the electronic device are provided. The electronic device includes a front case including a display unit, a rear case coupled to the front case and including a mounting space of a battery, a speaker module configured to form at least one side wall of the mounting space of the battery, and a battery cover configured to cover at least the mounting space of the battery.

21 Claims, 7 Drawing Sheets

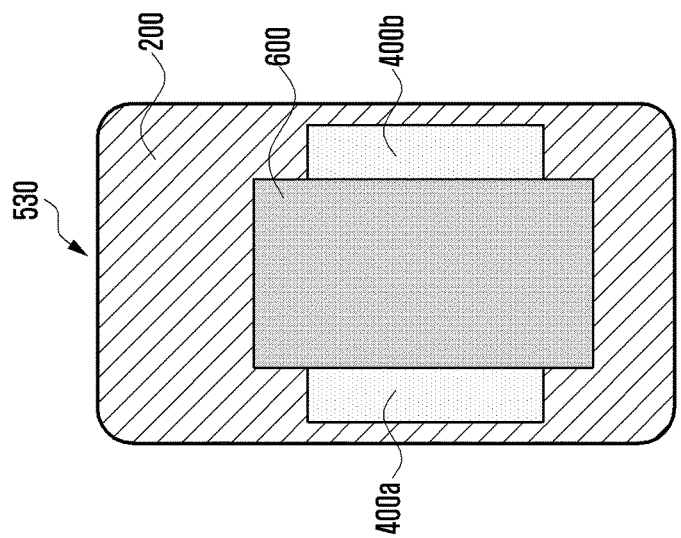
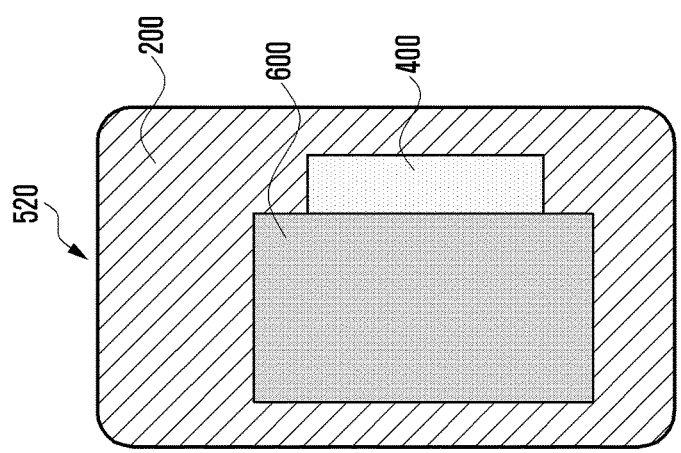
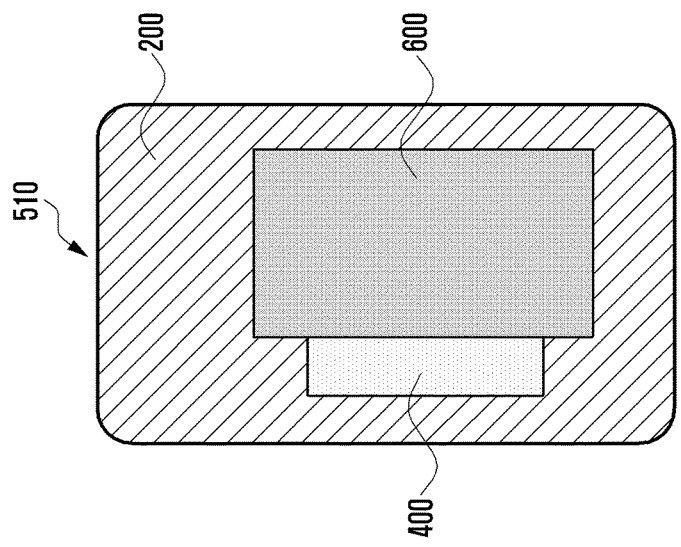

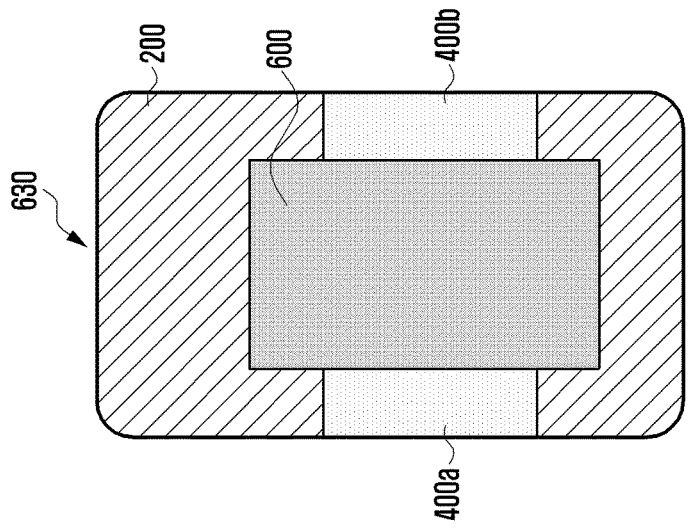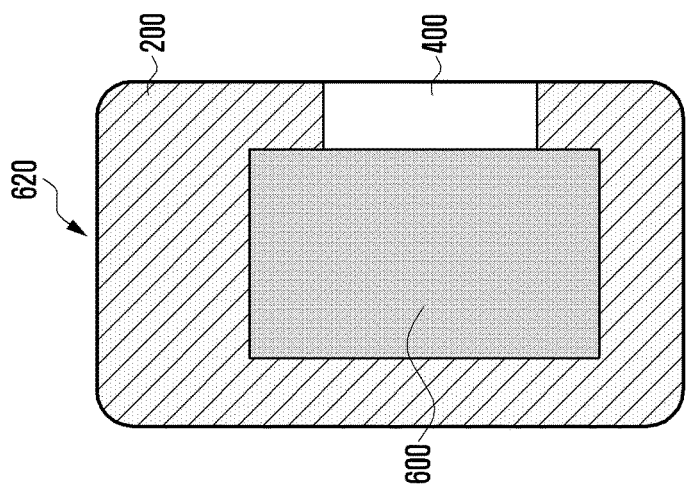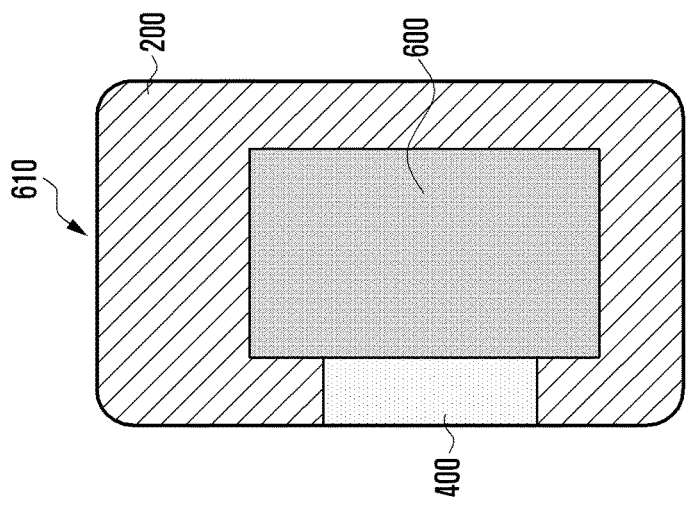

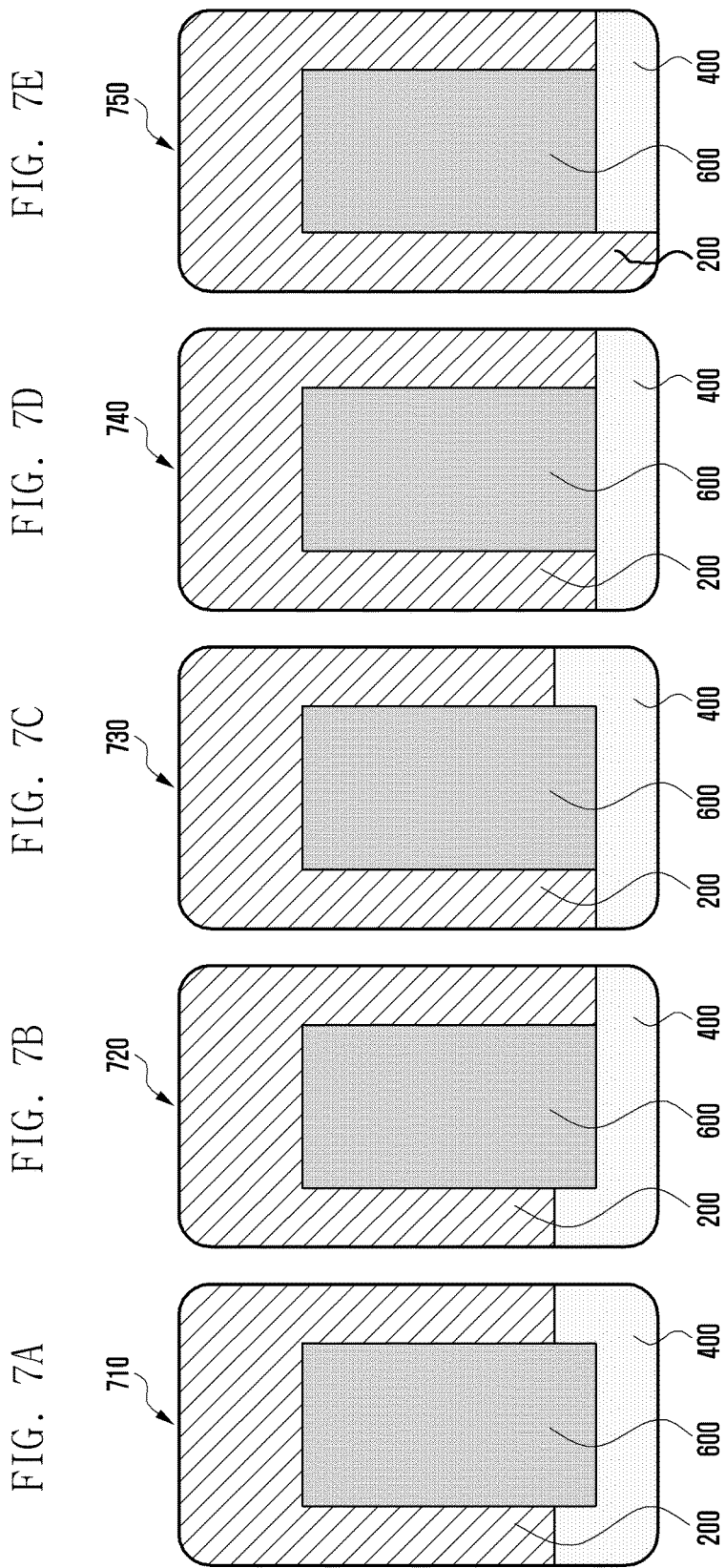

ELECTRONIC DEVICE INCLUDING SOUND OUTPUT MODULE AND HOUSING FOR THE ELECTRONIC DEVICE

CROSS-REFERENCE TO RELATED APPLICATION(S)

This application claims the benefit under 35 U.S.C. §119(a) of a Korean patent application filed on Mar. 13, 2013 in the Korean Intellectual Property Office and assigned Serial number 10-2013-0026498, the entire disclosure of which is hereby incorporated by reference.

TECHNICAL FIELD

The present disclosure relates to an electronic device. More particularly, the present disclosure relates to an electronic device including a sound output module and a housing for the electronic device.

BACKGROUND

Currently, electronic devices provide various functions such as a communication function, music reproduction function, photographing function, and Internet connection function. In this document, the electronic device includes, for example a mobile communication electronic device, smart phone, Personal Digital Assistant (PDA), tablet Personnel Computer (PC), hand-held PC, and Portable Multimedia Player (PMP), but the electronic device is not limited thereto. Such an electronic device may include various elements, for example a sound output module, camera module, and battery that provide various functions.

However, in order to improve portability, there is a desire for an electronic device having a reduced thickness. The reduced thickness makes it difficult in recent electronic devices to secure mounting space of elements to provide the foregoing various functions. Therefore, necessity to provide an electronic device having a reduced thickness while including various elements is desired.

Currently, in order to provide various audio performances, a recent electronic device includes a sound output module (e.g., a speaker module). For example, in a mobile phone (e.g., a feature phone or a smart phone), portable music player (e.g., an MP3 player or a Samsung Galaxy Player™), portable camera (e.g., a Samsung Galaxy Camera™), and tablet PC (e.g., a Samsung Galaxy Tab™, a Samsung Galaxy Note™), a sound output module provides various audio reproduction functions as well as a speaker phone function.

Particularly, the sound output module needs resonant space enough to secure a performance of an audio performance, particularly medium and low frequency band sound. However, as an electronic device has a reduced thickness, it is difficult to secure resonant space of a sound output module of the electronic device.

Accordingly, an electronic device including a sound output module that may secure resonant space of a sound output module and a housing for the electronic device is desired.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device including a sound output module that may secure resonant space of a sound output module and a housing for the electronic device.

Another aspect of the present disclosure is to provide an electronic device including a sound output module that may enable an electronic device to have a small thickness and a housing for the electronic device.

In the present various embodiments, a configuration of a sound output module is generally described, but in a case of other elements (e.g., an electronic module such as an antenna module, camera module, vibration motor module, and pen module or a shield can), enough space may be secured within an electronic device having a small thickness through the same or similar configuration.

In accordance with an aspect of the present disclosure, an electronic device is provided. The electronic device includes a front case including a display unit, a rear case coupled to the front case and including a mounting space of a battery, a speaker module configured to form at least one side wall of the mounting space of the battery, and a battery cover configured to cover at least the mounting space of the battery.

In accordance with another aspect of the present disclosure, a housing for an electronic device is provided. The housing includes a first case having an opening, and a second case coupled to the first case and including a space to receive a sound output module and a battery, wherein the battery is housed at a space defined according to the second case and the sound output module.

In accordance with another aspect of the present disclosure, an electronic device is provided. The electronic device includes a case including a space to house a battery and a speaker module. The speaker module is mounted within the case and outputs a sound signal. The speaker module is disposed within the space. One side surface of the speaker module is opposite to one side surface of the battery.

In accordance with another aspect of the present disclosure, an electronic device is provided. The electronic device includes a first case including an opening configured to expose a display unit, a second case coupled to the first case and including a mounting space of a battery and a speaker module, and a third case coupled to the second case and configured to cover the mounting space of the battery and the speaker module. The mounting space of the speaker module is formed according to the battery, the second case, and the third case.

In accordance with another aspect of the present disclosure, an electronic device is provided. The electronic device includes a first case configured to expose a display unit, and a second case coupled to the first case and including a mounting space of a battery and an electronic module. The mounting space of the electronic module is configured to expose at least a portion of one side surface of the battery.

In accordance with another aspect of the present disclosure, an electronic device is provided. The electronic device includes a first case including a mounting space of a display unit, and a second case coupled to the first case and including a mounting space of a battery and a sound output module, wherein the mounting space of the sound output module exposes at least a portion of one side surface of the battery.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 5A, 5B, and 5C are diagrams illustrates an example of a structure in which a sound output module is positioned at a left side and a right side of a second case according to another embodiment of the present disclosure;

FIGS. 6A, 6B, and 6C are diagrams illustrating another example of a structure positioned at a left side and a right side of a sound output module and a second case according to another embodiment of the present disclosure; and FIGS. 7A, 7B, 7C, 7D, and 7E are diagrams illustrating various examples of structures in which a sound output module is positioned at a second case according to another embodiment of the present disclosure.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An electronic device according to an embodiment of the present disclosure includes a sound output module and may be a mobile communication electronic device, smart phone, Personal Digital Assistant (PDA), tablet Personnel Computer (PC), hand-held PC, and portable multimedia player (PMP).

As described above, in the electronic device, in order to secure an audio performance, particularly a performance of medium and low frequency band sound, a sound output module (e.g., a speaker module) needs resonant space. However, as the electronic device has a reduced thickness, it is difficult for the electronic device to secure resonant space of the sound output module (speaker module).

Hereinafter, various embodiments of the present disclosure suggest a configuration that may solve such a problem.

Figure 1A:
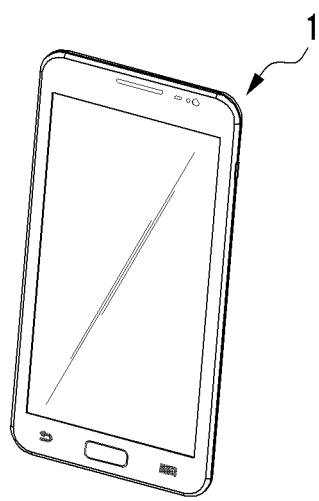
FIGS. 1A and 1B are a perspective view and an exploded perspective view, respectively, illustrating a general electronic device according to an embodiment of the present disclosure.
Figure 1B:
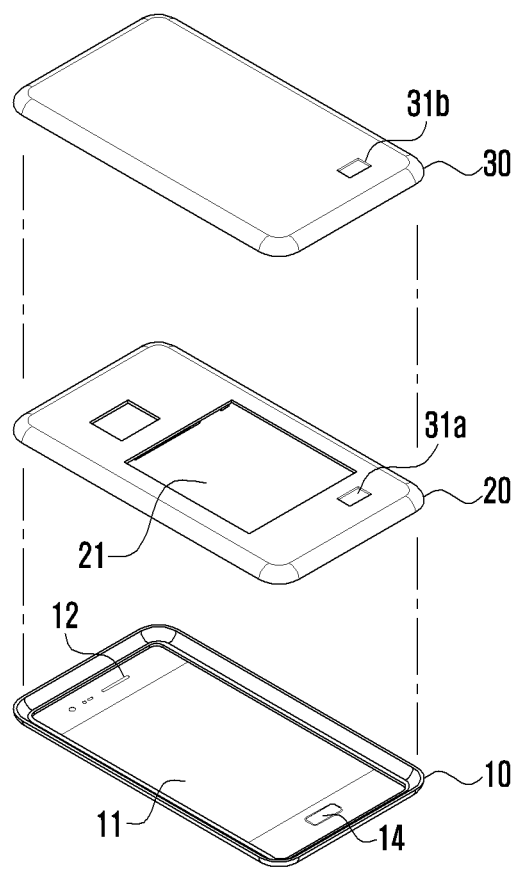

FIGS. 1A and 1B are a perspective view and an exploded perspective view illustrating a general electronic device according to an embodiment of the present disclosure.

Referring to FIGS. 1A and 1B, an electronic device 1 may be formed in a quadrangular bar type, as illustrated in FIG. 1A. Such an electronic device 1 may include a front case 10, rear case 20, and battery cover 30, as shown in FIG. 1B. In the front case 10 of the electronic device 1, a display unit (not illustrated) and a protective window (not illustrated) may be mounted. For this, in the front case 10, a first opening portion 11 that exposes the display unit and the protective window may be formed. Further, in the front case 10, a receiver hole 12 and a home key hole 14 may be further formed. The rear case 20 may be coupled to the front case 10. In the rear case 20, a second opening portion 21 that mounts a battery and a first speaker hole 31a that emits a sound signal to the outside may be formed.

The battery cover 30 is detachably coupled to the rear case 20 and prevents a battery (not illustrated) from separating. In the battery cover 30, a second speaker hole 31b that emits a sound signal to the outside may be formed. The second speaker hole 31b may formed to correspond to the first speaker hole 31a.

Figure 2A:
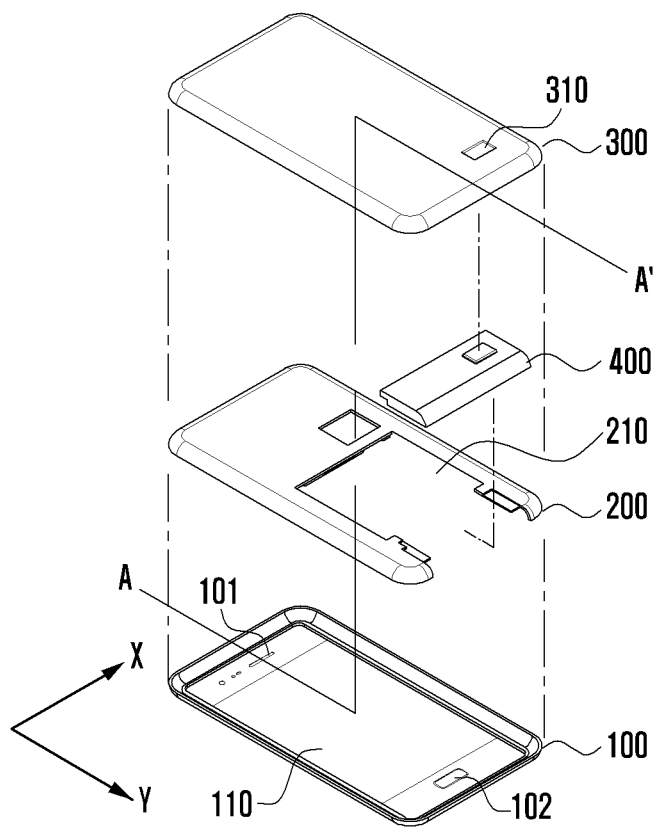
FIG. 2A is an exploded perspective view of an electronic device according to an embodiment of the present disclosure.
Figure 2B:
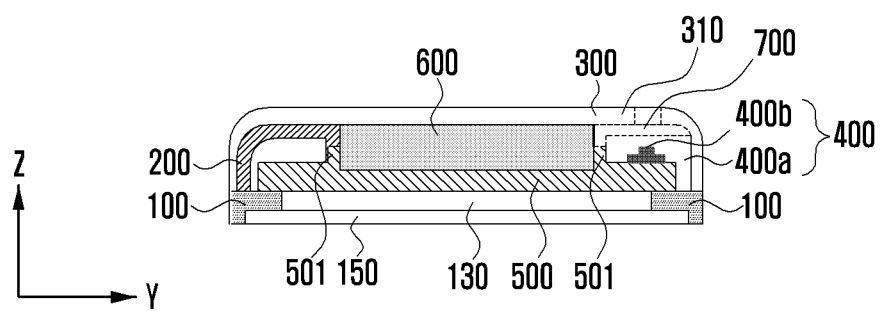
FIG. 2B is a cross-sectional view taken along line A-A' of the electronic device of FIG. 2A according to an embodiment of the present disclosure.

FIG. 2A is an exploded perspective view of an electronic device according to an embodiment of the present disclosure, and FIG. 2B is a cross-sectional view taken along line A-A' of the electronic device of FIG. 2A according to an embodiment of the present disclosure.

Referring to FIGS. 2A and 2B, the electronic device according to the present embodiment may be formed in a quadrangular bar type. However, various embodiments of the present disclosure are not limited thereto. For example, the electronic device according to the present embodiment may be formed in a folder type and a slide type. Such an electronic device may include a first case 100, second case 200, cover case 300, sound output module 400, support member 500, and battery 600. The first case 100, second case 200, cover case 300, and sound output module 400 may be coupled through at least one of mechanical coupling (e.g., screw coupling and hook coupling), chemical coupling (e.g., one-part bonding liquid and two-part bonding liquid), a thermal fusion-bonding method, a supersonic wave fusion-bonding method, and an epoxy hardening method.

In the first case 100, a display unit 130 may be mounted. Further, in the first case 100, a protective window 150 to protect the display unit 130 may be mounted. Such a first case 100 may become a front case of the electronic device. A first case 100 according to another embodiment of the present disclosure is a display module and may have a structure formed in a module. In the first case 100, an opening 110 that enables the display unit 130 to be exposed to the outside, a receiver hole 101 to discharge sound of a communication speaker (not illustrated) to the outside, and a home key hole 102 that may insert a physically formed home key (not illustrated) may be formed.

The second case 200 may be coupled to the first case 100. Further, the second case 200 may be coupled to the detachable cover case 300. That is, the second case 200 may be disposed between the first case 100 and the cover case 300. The second case 200 may be referred to a rear case, rear cover, rear cover case, back cover, back case, or rear housing of the electronic device. The second case 200 according to the present embodiment includes a mounting area of the battery 600 in an opening 210 and a mounting area of the sound output module 400.

The cover case 300 may be detachably fastened to the second case 200 and prevents the battery 600 from separating. That is, the cover case 300 may be a battery cover. The cover case 300 may have a speaker hole 310 to emit an audio signal output from the sound output module 400 to the outside. FIGS. 2A and 2B illustrate that the cover case 300 covers the entire second case 200, but various embodiments of the present disclosure are not limited thereto. For example, the cover case 300 may be formed to cover only a mounting area of the battery 600 of the second case 200 or only a mounting area of the battery 600 and the sound output module 400.

The sound output module 400 outputs an audio signal and may be formed with a first sound output module 400a (i.e., a carrier) and a second sound output module 400b (i.e., a speaker). In this case, internal space of the first sound output module 400a is used as resonant space of the second sound output module 400b (i.e., speaker). The sound output module 400 may be referred to as a speaker module or a sound carrier module. The sound output module 400 may be fastened to the second case 200. Particularly, when the battery 600 is mounted, the sound output module 400 according to the present embodiment may be fastened to the second case 200 so that one side surface contacts with the battery 600 or is adjacent to the battery 600. Specifically, the sound output module 400 may form one side wall of mounting space to mount the battery 600. That is, mounting space of the sound output module 400 may be formed so that at least a portion of one side surface of the battery 600 is exposed at mounting space of the sound output module 400. In this way, in the present embodiment, a structure (e.g., a portion of the second case 200) does not exist between the sound output module 400 and the battery 600. That is, the battery 600 may be received at space defined according to the second case 200 and the sound output module 400. Therefore, in the present embodiment, resonant space of the sound output module 400 may be fully secured in a length direction (a Y-axis direction).

Further, the sound output module 400 includes a first surface (e.g., an upper surface) facing the cover case 300, and the first surface may contact with the cover case 300 or may be adjacent to the cover case 300. For this, mounting space of the sound output module 400 included in the second case 200 may be formed so that at least a portion of the first surface is exposed from the cover case 300. That is, a structure (e.g., a portion of the second case 200) does not exist between the first surface of the sound output module 400 and the cover case 300. Therefore, in the present embodiment, resonant space of the sound output module 400 may be extended in a thickness direction (Z-axis direction). The sound output module 400 further includes a second surface facing the opposite side of the cover case 300, and at least a partial area of the second surface may contact with the first case 100 or may be adjacent to the first case 100. In this case, another partial area of the second surface of the sound output module 400 may contact with the support member 500 or may be adjacent to the support member 500.

Such a sound output module 400 may be coupled to at least one of the second case 200 and the support member 500 through at least one of mechanical coupling (e.g., screw coupling or hook coupling), chemical coupling (e.g., one-part bonding liquid, two-part bonding liquid), a thermal fusion-bonding method, a supersonic wave fusion-bonding method, and an epoxy hardening method. Thereby, in the present embodiment, strength of the second case 200 that may be weakened by removing the second case 200 between the battery 600 and the sound output module 400 may be reinforced.

The sound output module 400 may occupy a volume of the entire electronic device, for example a volume of about 5%, 10%, 15%, 20%, 25%, 30%, 35%, or 40% or a volume within a range which two values of previously listed values are determined as a maximum value and a minimum value. For example, the sound output module 400 may occupy a volume of about 10-40% of the entire electronic device. However, various embodiments of the present disclosure are not limited thereto and an occupying volume of the sound output module 400 may be variously changed according to a specification of the electron device.

The support member 500 is positioned between the first case 100 and the second case 200 to maintain strength (or rigidity) of the electronic device. For this, it is preferable that the support member 500 may be made of a metal material (e.g., magnesium, aluminum, stainless). Such a support member 500 may become a bracket. The sound output module 400 may be mounted on the support member 500. That is, the support member 500 may support the sound output module 400.

Further, in the support member 500, a protrusion 501 that supports the battery 600 is formed. The protrusion 501 may have a height lower than that of the battery 600. For example, the protrusion 501 supports the battery 600, and when an impact occurs in a Y-axis direction, the protrusion 501 may be formed in a minimum height that may prevent damage in which the battery 600 gives to the sound output module 400. For example, the protrusion 501 may have a height of about 30% to 60% (e.g., 30%, 35%, 40%, 45%, 50%, 55%, or 60%) of a height of the battery 600. However, various embodiments of the present disclosure are not limited thereto and a height of the protrusion 501 may be variously formed according to a designer's intention.

Referring to a cross-sectional view of FIG. 2B, in an electronic device according to the present embodiment, because a structure (e.g., a portion of the second case 200) does not exist between the sound output module 400 and the cover case 300 and between the sound output module 400 and the battery 600, resonant space of the sound output module 400 may be fully secured by a size of reference numeral 700. By securing the resonant space, the electronic device of the present embodiment may have an improved performance of a speaker.

Further, in a description in relation to FIG. 2B, it has been described that resonant space of the sound output module 400 is secured in a Y-axis direction and a Z-axis direction, but when resonant space of the sound output module 400 is extended only in a Y-axis direction, in the present embodiment, the electronic device may have a small thickness by a removed thickness of the second case 200. That is, the electronic device of the present embodiment may secure a performance of a speaker while having a small thickness.

Although not illustrated in FIGS. 2A and 2B, the electronic device may further include a printed circuit board in which a plurality of electronic elements are mounted, camera module to photograph an image or a moving picture, vibration motor to generate a vibration, and antenna to transmit and receive a wireless signal.

Figure 3A:
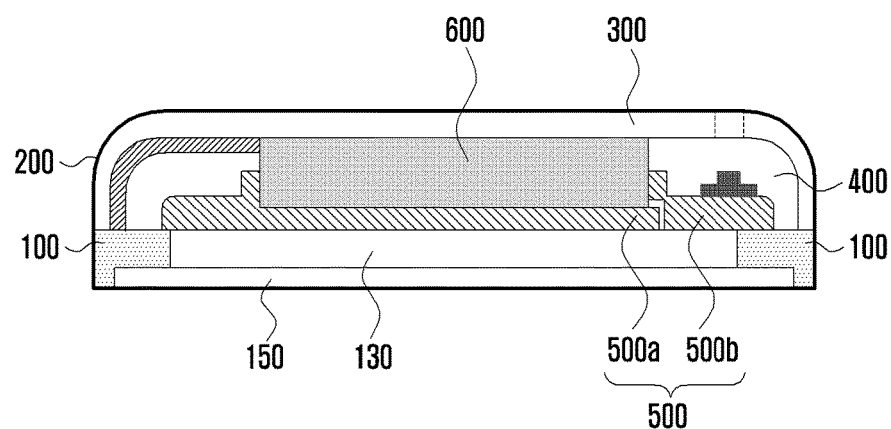
FIG. 3A is a cross-sectional view illustrating an electronic device according to another embodiment of the present disclosure.

FIG. 3A is a cross-sectional view illustrating an electronic device according to another embodiment of the present disclosure.

Referring to FIG. 3A, the electronic device according to the present embodiment may include a first case 100, second case 200, cover case 300, sound output module 400, support member 500, and battery 600. The first case 100 may house a display unit 130 and a protective window 150.

The support member 500 may be formed with a first support member 500a positioned at a bottom surface of the battery 600 and a second support member 500b positioned at a bottom surface of the sound output module 400. The electronic device according to the present embodiment has the same configuration as that of the electronic device according to the foregoing embodiment of the present disclosure, except for such a difference. Therefore, a detailed description of other elements of the electronic device according to the present embodiment is omitted.

Figure 3B:
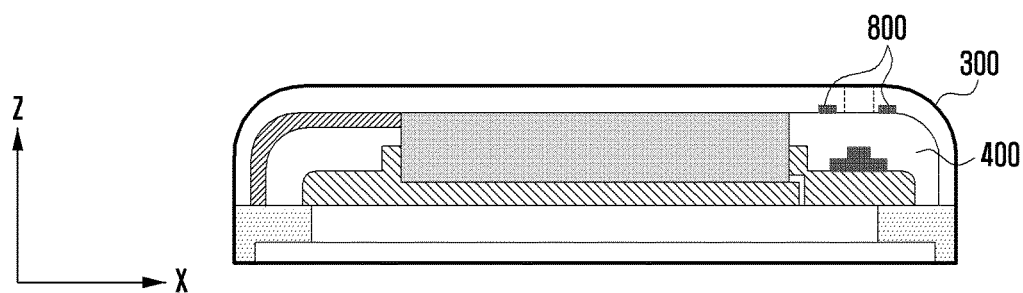
FIG. 3B is a cross-sectional view illustrating an electronic device according to another embodiment of the present disclosure.

FIG. 3B is a cross-sectional view illustrating an electronic device according to another embodiment of the present disclosure.

Referring to FIG. 3B, a sound output module 400 of the electronic device according to the present embodiment further includes an antenna pattern 800 at least partially housed to be adjacent to an outer side surface (e.g., a first surface facing the cover case 300). That is, in the electronic device according to the present embodiment, the sound output module 400 and the antenna pattern 800 are integrally formed. As described in relation to FIGS. 2A and 2B, in the present embodiment, in a Z-axis direction, a size of the sound output module 400 may be increased. That is, in an electronic device according to another embodiment of the present disclosure, a separation distance between the antenna pattern 800 and electronic elements increases, compared with an electronic device. Thereby, in the electronic device according to the present embodiment, an influence in which noise of electronic elements has the antenna pattern 800 may be reduced. Therefore, in the electronic device according to the present embodiment, a radiation performance of an antenna may be improved. The electronic device according to the present embodiment has the same configuration as that of the electronic device according to the foregoing various embodiments of the present disclosure, except for such a difference. Therefore, a detailed description of other elements of the electronic device according to the present embodiment is omitted.

Figure 4A:
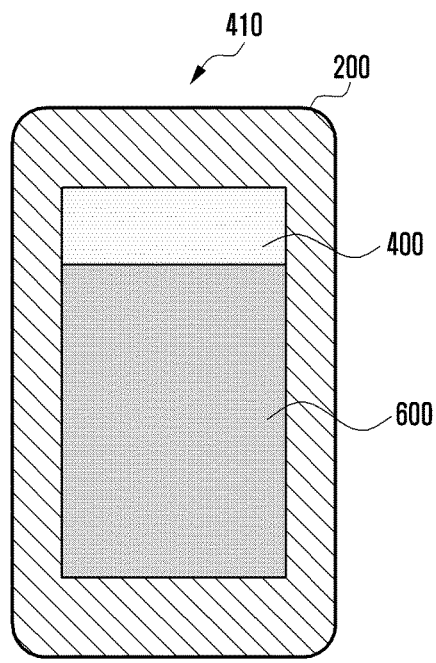
FIG. 4A is a diagram illustrating an example of a structure in which a sound output module is positioned at an upper end portion of a second case according to an embodiment of the present disclosure.

FIG. 4A is a diagram illustrating an example of a structure in which a sound output module is positioned at an upper end portion of a second case according to an embodiment of the present disclosure.

Referring to FIG. 4A, an electronic device 410 includes the sound output module 400 according to the present embodiment. The sound output module 400 may be positioned at an upper end portion of the second case 200. In other words, mounting space of the sound output module 400 may be formed at an upper end portion of mounting space of the battery 600. In this case, the sound output module 400 may be positioned so that one side surface of the sound output module 400 contacts with the battery 600 or is adjacent to the battery 600. That is, the sound output module 400 may form an upper end side wall of mounting space of the battery 600. In this case, housing space of the sound output module 400 of the second case 200 may be closed space.

Figure 4B:
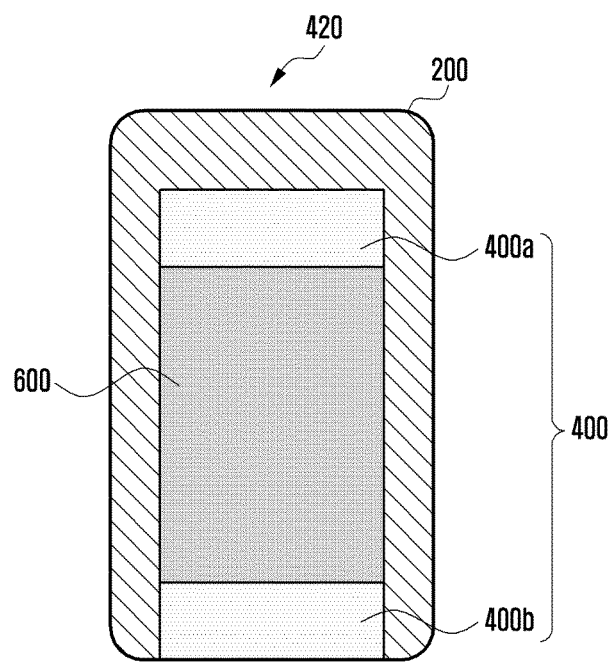
FIG. 4B is a diagram illustrating an example of a structure in which sound output modules are positioned at an upper end portion and a lower end portion of a second case according to another embodiment of the present disclosure.

FIG. 4B is a diagram illustrating an example of a structure in which sound output modules are positioned at an upper end portion and a lower end portion of a second case according to another embodiment of the present disclosure.

Referring to FIG. 4B, when the electronic device 420 includes two speakers, i.e., when the electronic device supports a stereo output, a first sound output module 400a and a second sound output module 400b may be positioned at an upper end portion and a lower end portion, respectively, of a second case 200. In other words, mounting space of the sound output module 400 may be formed in an upper end portion and a lower end portion of mounting space of a battery 600. In this case, one side surface of the first sound output module 400a and the second sound output module 400b may contact with one side surface of the battery 600 or may be adjacent to one side surface of the battery 600. That is, the first sound output module 400a may form an upper end side wall of mounting space of the battery 600, and the second sound output module 400b may form a lower end side wall of mounting space of the battery 600. Mounting space of the first sound output module 400a may be space of a closed form, and mounting space of the second sound output module 400b may be space of a form in which one side surface (opposite surface of the battery) is opened. However, various embodiments of the present disclosure are not limited thereto. For example, mounting space of the first sound output module 400a may be formed as space of an opened form, and mounting space of the second sound output module 400b may be formed as space of a closed form. Alternatively, mounting space of the first sound output module 400a and the second sound output module 400b may be formed as space of a closed form or space of an opened form.

FIGS. 5A to 5C are diagrams illustrating an example of a structure in which a sound output module is positioned at a left side and a right side of a second case according to another embodiment of the present disclosure.

Referring to FIG. 5A, an electronic device 510 includes the sound output module 400 positioned at the left side of the second case 200 to contact with one side (left side) of the battery 600 or to be adjacent to one side (left side) of the battery 600. That is, the sound output module 400 may form a left side wall of mounting space of the battery 600. In other words, mounting space of the sound output module 400 may be formed at the left side of mounting space of the battery 600.

Referring to FIG. 5B, an electronic device 520 includes a sound output module 400 is positioned at the right side of a second case 200 to contact with one side (right side) of a battery 600 or to be adjacent to one side (right side) of a battery 600. That is, the sound output module 400 may form a right side wall of mounting space of the battery 600. In other words, mounting space of the sound output module 400 may be formed at the right side of mounting space of the battery 600.

Referring to FIG. 5C, when the electronic device 530 supports a stereo output, a sound output module 400 may be formed with a first sound output module 400*a* positioned at the left side of a battery 600 and a second sound output module 400*b* positioned at the right side of the battery 600. The first sound output module 400*a* is positioned at the left side of a second case 200 to contact with one side of the battery 600 or to be adjacent to one side of the battery 600, and the second sound output module 400*b* is positioned at the right side of the second case 200 to contact with one side of the battery 600 or to be adjacent to one side of the battery 600. That is, the first sound output module 400*a* may form a left side wall of mounting space of the battery 600, and the second sound output module 400*b* may form a right side wall of mounting space of the battery 600. In other words, mounting space of the sound output module 400 may be formed at the left side and the right side of mounting space of the battery 600. Specifically, mounting space of the first sound output module 400*a* may be formed at the left side of mounting space of the battery 600, and mounting space of the second sound output module 400*b* may be formed at the right side of mounting space of the battery 600. In this case, mounting space of the sound output module 400 formed in at least one of the left side and the right side of the second case 200 is formed in a closed form.

FIGS. 6A to 6C are diagrams illustrating another example of a structure positioned at a left side and a right side of a sound output module and a second case according to another embodiment of the present disclosure.

Referring to FIG. 6A, an electronic device 610 includes a sound output module 400 may be positioned in at least one location of the left side and the right side of a battery 600. In this case, unlike FIGS. 5A to 5C, mounting space of the sound output module 400 formed in one location of the left side and the right side of a second case 200 shown in FIGS. 6A to 6C may be formed in a form in which one side is opened. For example, a right side surface of the sound output module 400 may contact with the battery 600 or may be adjacent to the battery 600, and a left side surface of the sound output module 400 may be exposed, i.e., may be opened to the outside to contact with a cover case 300 or to be adjacent to a cover case 300.

Referring to FIG. 6B, an electronic device 620 includes a left side surface of a sound output module 400 that may be in contact with a battery 600 or may be adjacent to a battery 600, and a right side surface of the sound output module 400 may be exposed, i.e., may be opened to the outside to contact with a cover case 300 or to be adjacent to a cover case 300.

Referring to FIG. 6C, an electronic device 630 includes a right side surface of a first sound output module 400*a* that may be in contact with a left side surface of a battery 600 or may be adjacent to a left side surface of a battery 600, and a left side surface of the sound output module 400 may contact with a cover case 300 or may be adjacent to a cover case 300. A left side surface of a second output module 400*b* may contact with a right side surface of the battery 600 or may be adjacent to a right side surface of the battery 600, and a right side surface of the second output module 400*b* may contact with a cover case 300 or may be adjacent to a cover case 300.

FIGS. 7A to 7E are diagrams illustrating various examples of structures in which a sound output module is positioned at a second case according to another embodiment of the present disclosure.

Referring to FIG. 7A, an electronic device 710 includes a sound output module 400 that may be formed in various shapes. For example, the sound output module 400 may be formed in 'U' shape to enclose a portion of a lower end portion and the lateral side of a battery 600. That is, the sound output module 400 of FIG. 7A may form a portion of a lower end side wall and a lateral side wall of mounting space of the battery 600. When the sound output module 400 of the 'U' shape is positioned at an upper end portion of a second case 200, the sound output module 400 may form a portion of an upper end side wall and a lateral side wall of mounting space of the battery 600. In other words, mounting space of the sound output module 400 may be formed so that a portion of a lower end portion and a lateral portion of the battery 600 is exposed or so that a portion of an upper end portion and a lateral portion of the battery 600 is exposed.

Referring to FIG. 7B, an electronic device 720 includes a sound output module 400 that may be formed in 'L' shape to enclose a portion of a lower end portion and the left side of a battery 600. That is, the sound output module 400 of FIG. 7B may form a portion of a lower end side wall and a left side wall of mounting space of the battery 600. When the sound output module 400 of 'L' shape is positioned at an upper end portion of a second case 200, the sound output module 400 may form a portion of an upper end side wall and a left side wall of mounting space of the battery 600. In other words, mounting space of the sound output module 400 may be formed so that a portion of a lower end portion and the left side of the battery 600 is exposed or so that a portion of an upper end portion and the left side of the battery 600 is exposed.

Referring to FIG. 7C, an electronic device 730 includes a sound output module 400 that may be formed in an inverse shape of 'L' to enclose a portion of a lower end portion and the right side of a battery 600. That is, the sound output module 400 of FIG. 7C may form a portion of a lower end side wall and a right side wall of mounting space of the battery 600. When the sound output module 400 of an inverse shape of 'L' is positioned at the upper end portion of a second case 200, the sound output module 400 may form a portion of an upper end side wall and a right side wall of mounting space of the battery 600. In other words, mounting space of the sound output module 400 may be formed so that a portion of a lower end portion and the right side of the battery 600 is exposed or so that a portion of an upper end portion and the right side of the battery 600 is exposed.

Referring to FIG. 7D, an electronic device 740 includes a sound output module 400 that may be formed in a minus '−' shape in a lower end portion of a battery 600. That is, the sound output module 400 of FIG. 7D forms a lower end side wall of mounting space of the battery 600 and is extended to the left side and the right side to have the same width length as that of a second case 200. The sound output module 400 of a minus '−' shape of FIG. 7D may be positioned at an upper end portion of the second case 200. In other words, mounting space of the sound output module 400 is formed so that an entire upper end portion or lower end portion of the battery 600 is exposed and may be extended to an end portion of the left side and the right side of the second case 200. That is, mounting space of the sound output module 400 may be formed according to the battery 600, the second case 200, and the third case 300.

Referring to FIG. 7E, an electronic device 750 includes a sound output module 400 that may be formed in a minus '-' shape. However, unlike a case of FIG. 7D, the sound output module 400 of FIG. 7E may be extended only to the right side. That is, a width length of the sound output module 400 of FIG. 7E may be greater than that of a battery 600 and may be smaller than that of a second case 200. The sound output module 400 of a minus '-' shape of FIG. 7E may be positioned at an upper end portion of the second case 200. Further, unlike a case of FIG. 7E, the sound output module 400 according to another embodiment of the present disclosure forms a lower end side wall of mounting space of the battery 600 and may be extended only to the left side. In other words, mounting space of the sound output module 400 is formed so that an entire upper end portion or lower end portion of the battery 600 is exposed and may be extended to an end portion of the left side or the right side of the second case 200.

As illustrated in FIGS. 7A to 7E, the second case 200 may be formed to correspond to various shapes of the sound output module 400. Mounting space of the battery 600 is formed by a partial side wall of the sound output module 400 and a partial side wall of the second case 200.

In the foregoing embodiment, various structures in which the sound output module 400 and the second case 200 may be coupled have been described. However, the present disclosure is not limited to the above-described examples and may be formed by various combinations of various embodiments described with reference to the drawings.

In the foregoing embodiment, an electronic device including a cover case has been exemplified. However, the present embodiment may be applied to an electronic device that does not include a cover case. For example, the electronic device includes a case including space that houses a battery and a speaker module and a speaker module mounted within the case and that outputs a sound signal, and the speaker module may be disposed at a position at which one side surface of the speaker module faces one side surface of the battery within the space. The case may include a first case including an opening that exposes a display unit and a second case coupled to the first case. One surface of the speaker module may be formed at a position opposite to an inner surface of the second case. Further, in the foregoing description, an electronic device of a bar form has been exemplified. However, the present embodiment may be applied to a folder type electronic device and a slide type electronic device.

Further, in the foregoing description, security of resonant space of a sound output module has been described. However, by applying the same method (or structure) as or a method (or structure) similar to that of an embodiment of the present disclosure to another electronic module (or an electronic element) or a shield may other than a sound output module, enough space may be secured within an electronic device having a small thickness. The electronic module may be an antenna module, camera module, vibration motor module, and pen module. For example, an electronic device according to another embodiment of the present disclosure may include a first case that exposes a display unit and a second case coupled to the first case and including mounting space of a battery and an electronic module. Mounting space of the electronic module may be formed so that at least a portion of one side surface of the battery is exposed at mounting space of the electronic module.

As described above, an electronic device including a sound output module according to various embodiments of the present disclosure may effectively secure a size (or a volume) of the sound output module within given mounting space. Therefore, the electronic device may secure resonant space of a speaker and thus a configuration of the electronic device may improve a performance of the speaker.

Further, by removing a second case between the sound output module and a cover case, the electronic device may have a small thickness.

Further, in various embodiments of the present disclosure, by coupling a sound output module, first case, second case, and support member through mechanical coupling or chemical coupling, strength of the electronic device may be enhanced.

Further, when an antenna pattern is mounted at an outer side surface (a surface facing a cover case) of the sound output module, due to increase in a thickness of the sound output module, a separation distance between the antenna pattern and an electronic element relatively increases. Thereby, a radiation performance of the electronic device is improved.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:
1. An electronic device, the electronic device comprising:
a front case comprising a display unit;
a rear case coupled to the front case and comprising a mounting space of a battery;
a speaker module, in an internal space of a carrier, the speaker module configured to form at least one side wall of the mounting space of the battery; and
a battery cover configured to cover at least the mounting space of the battery,
wherein the internal space of the carrier causes a resonance of a sound outputted from the speaker module,
wherein the speaker module includes a first speaker module for forming an upper end side wall and a second speaker module for forming a lower end side wall of the mounting space of the battery, and
wherein a mounting space of the first speaker module and the second speaker module are formed as space of a closed form or space of an opened form.
2. The electronic device of claim 1,
wherein the speaker module comprises a first surface facing the battery cover, and
wherein the first surface is one of in contact with the battery cover and adjacent to the battery cover.
3. The electronic device of claim 2,
wherein the speaker module further comprises a second surface that is opposite the first surface and spaced apart from the battery cover, and
wherein at least a partial area of the second surface is one of in contact with the front case and adjacent to the front case.
4. The electronic device of claim 3, wherein the electronic device further comprises a bracket positioned between the front case and the speaker module.
5. The electronic device of claim 4, wherein another partial area of the second surface of the speaker module is one of in contact with the bracket and adjacent to the bracket.
6. The electronic device of claim 4, wherein the speaker module is coupled to at least one of the rear case, the front case, and the bracket.

7. The electronic device of claim 6, wherein the speaker module comprises a fastening portion configured to mechanically couple to at least one of the rear case, the front case, and the bracket.

8. The electronic device of claim 6, wherein the speaker module is coupled to at least one of the rear case, the front case, and the bracket through at least one of chemical coupling, a thermal fusion-bonding method, a supersonic wave fusion-bonding method, and an epoxy hardening method.

9. The electronic device of claim 1, wherein the speaker module further comprises an antenna pattern at least partially housed adjacent to a first surface facing the battery cover.

10. The electronic device of claim 1, wherein the speaker module forms at least one of a left side wall and a right side wall of the mounting space of the battery.

11. The electronic device of claim 1, wherein the rear case forms a mounting space of the speaker module as one of a closed space and a space in which one side is opened.

12. The electronic device of claim 1, wherein the speaker module forms one of a portion of a lower end side wall and a lateral side wall of the mounting space of the battery and a portion of an upper end side wall and the lateral side wall of the mounting space of the battery.

13. The electronic device of claim 1, wherein the speaker module forms one of a portion of a lower end side wall and a left side wall of the mounting space of the battery and a portion of an upper end side wall and the left side wall of the mounting space of the battery.

14. The electronic device of claim 1, wherein the speaker module forms one of a portion of a lower end side wall and a right side wall of the mounting space of the battery and a portion of an upper end side wall and a right side wall of the mounting space of the battery.

15. The electronic device of claim 1, wherein the speaker module forms an entire upper end or a lower end side wall of the mounting space of the battery and is extended to at least one side end portion of a left side and a right side of the rear case.

16. A housing for an electronic device, the housing comprising:
a first case having an opening; and
a second case coupled to the first case and comprising a space to receive a sound output module and a battery,
wherein the battery is housed at the space defined according to the second case and in direct contact with the sound output module,
wherein the space causes a resonance of a sound outputted from the sound output module,
wherein the sound output module includes a first sound output module for forming an upper end side wall and a second sound output module for forming a lower end side wall of a mounting space of the battery, and
wherein a mounting space of the first sound output module and the second sound output module are formed as space of a closed form or space of an opened form.

17. An electronic device, the electronic device comprising:
a case comprising a space to house a battery and a speaker module,
wherein the speaker module is mounted within the case and outputs a sound signal,
wherein the speaker module is disposed within the space,
wherein one side surface of the speaker module is directly opposite to one side surface of the battery,
wherein the space causes a resonance of a sound corresponding to the sound signal,
wherein the speaker module includes a first speaker module for forming an upper end side wall and a second speaker module for forming a lower end side wall of a mounting space of the battery, and
wherein a mounting space of the first speaker module and the second speaker module are formed as space of a closed form or space of an opened form.

18. The electronic device of claim 17,
wherein the case comprises a first case comprising an opening configured to expose a display unit and a second case coupled to the first case, and
wherein within the space, one surface of the speaker module is formed at a position opposite to an inner surface of the second case.

19. An electronic device, the electronic device comprising:
a first case comprising an opening configured to expose a display unit;
a second case coupled to the first case and comprising a mounting space of a battery and a speaker module; and
a third case coupled to the second case and configured to cover the mounting space of the battery and the speaker module, a side surface of the speaker module being opposite of and in contact with a side surface of the battery,
wherein the mounting space of the speaker module is formed according to the battery, the second case, and the third case and causes a resonance of a sound outputted from the sound output module,
wherein the speaker module includes a first speaker module for forming an upper end side wall and a second speaker module for forming a lower end side wall of the mounting space of the battery, and
wherein a mounting space of the first speaker module and the second speaker module are formed as space of a closed form or space of an opened form.

20. The electronic device of claim 19, further comprising a support member positioned between the first case and the second case,
wherein the speaker module is mounted on the support member.

21. The electronic device of claim 19, wherein the speaker module is configured in a shape of one of a letter 'U', a letter 'L', an inverted letter 'L', a minus '−' sign along one of a lower end side wall and an upper end side wall of the second case.

* * * * *